US011655895B2

(12) United States Patent
Ganter

(10) Patent No.: US 11,655,895 B2
(45) Date of Patent: May 23, 2023

(54) INTEGRATED PARK MODULE SYSTEMS AND METHODS

(71) Applicant: Stoneridge, Inc., Novi, MI (US)

(72) Inventor: Brian Ganter, Foxborough, MA (US)

(73) Assignee: Stoneridge Inc., Novi, MI (US)

( * ) Notice: Subject to any disclaimer, the term of this patent is extended or adjusted under 35 U.S.C. 154(b) by 0 days.

(21) Appl. No.: 16/739,901

(22) Filed: Jan. 10, 2020

(65) Prior Publication Data
US 2020/0224766 A1  Jul. 16, 2020

Related U.S. Application Data

(60) Provisional application No. 62/791,149, filed on Jan. 11, 2019.

(51) Int. Cl.
*F16H 63/34* (2006.01)
*F16H 59/02* (2006.01)

(52) U.S. Cl.
CPC ..... *F16H 63/3475* (2013.01); *F16H 63/3433* (2013.01); *F16H 63/3466* (2013.01); *F16H 2059/0295* (2013.01)

(58) Field of Classification Search
CPC ............. F16H 63/3475; F16H 63/3433; F16H 63/3466; F16H 63/285; F16H 2059/0295
See application file for complete search history.

(56) References Cited

U.S. PATENT DOCUMENTS

| 2008/0169168 A1* | 7/2008 | Nishimura | F16H 63/3416 |
| | | | 192/219.5 |
| 2009/0321215 A1* | 12/2009 | Giefer | F16H 63/3433 |
| | | | 192/219.5 |
| 2017/0307080 A1* | 10/2017 | Bormann | B60T 1/005 |
| 2018/0172155 A1* | 6/2018 | Spratte | F16H 63/3475 |
| 2019/0383374 A1* | 12/2019 | Pfeiffer | F16H 63/3466 |

FOREIGN PATENT DOCUMENTS

DE  10045953  * 5/2002

OTHER PUBLICATIONS

Machine language translation of DE10045953.*

* cited by examiner

*Primary Examiner* — David R Morris
(74) *Attorney, Agent, or Firm* — Grossman, Tucker, Perreault & Pfleger, PLLC

(57) ABSTRACT

A shift-by-wire system comprises an integrated park module including a slider, a motor, a spring, and an actuator system. The slider can be disposed in a park position (PP) and a not-parked position (NPP) corresponding to a park mode and a not-park mode of a transmission, respectively. The motor and a gear-train cause the slider to move from the PP to the NPP and the spring urges the slider from the NPP to the PP. The actuator system retains the slider in the NPP after the motor and the gear-train have disengaged from the slider. The gear-train includes a default position (DP) corresponding to the PP and a maximum lift region (MLR) in which the actuator system retains the slider in the NPP. The gear-train rotates from the MLR to the DP while the actuator system retains the slider in the NPP.

19 Claims, 20 Drawing Sheets

INTEGRATED PARK MODULE SYSTEMS AND METHODS

CROSS-REFERENCE TO RELATED APPLICATIONS

The present application claims the benefit of U.S. Provisional Application No. 62/791,149, filed Jan. 11, 2019, which is fully incorporated herein by reference.

FIELD

The present disclosure relates generally to integrated park modules for automatic transmissions, and more particularly to actuators and actuator cams for integrated park modules.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

Recently, shift-by-wire systems for automatic transmissions have become more popular. Shift-by-wire systems are systems in which the transmission modes are engaged/changed in an automobile through electronic controls without any mechanical linkage between the gear shifting lever and the transmission. The transmission shifting was traditionally accomplished by mechanical links to put the vehicle in Park, Reverse, Neutral and Drive positions through a lever mounted on the steering column or a gear shifter near the center console. Shift-by-wire systems may replace the mechanical links with an Integrated Park Module (IPM) which is coupled to and/or disposed within the automatic transmission. The IPM is configured to receive a signal to engage/change different transmission modes. The use of the IPM may eliminate the routing space required for housing the mechanical linkages between the shifter and the transmission and provides effortless shifting through the press of a button or through knobs. Elimination of this linkage removes any shift effort from the driver's gear selection.

While current shift-by-wire systems have numerous benefits, the IPM should be designed to include a fail-safe system such that the transmission automatically shifts from a "Not-Park position" (i.e., any transmission mode/position other than the Park position) into the Park position, e.g., when electrical power is lost. Current IPMs require a large, powerful, and expensive solenoid to hold the transmission in the Not-Park position. As such, it is desirable to provide a IPM which does not require the use of a large, powerful, and expensive solenoid to hold the transmission in the Not-Park position.

Figure 1:
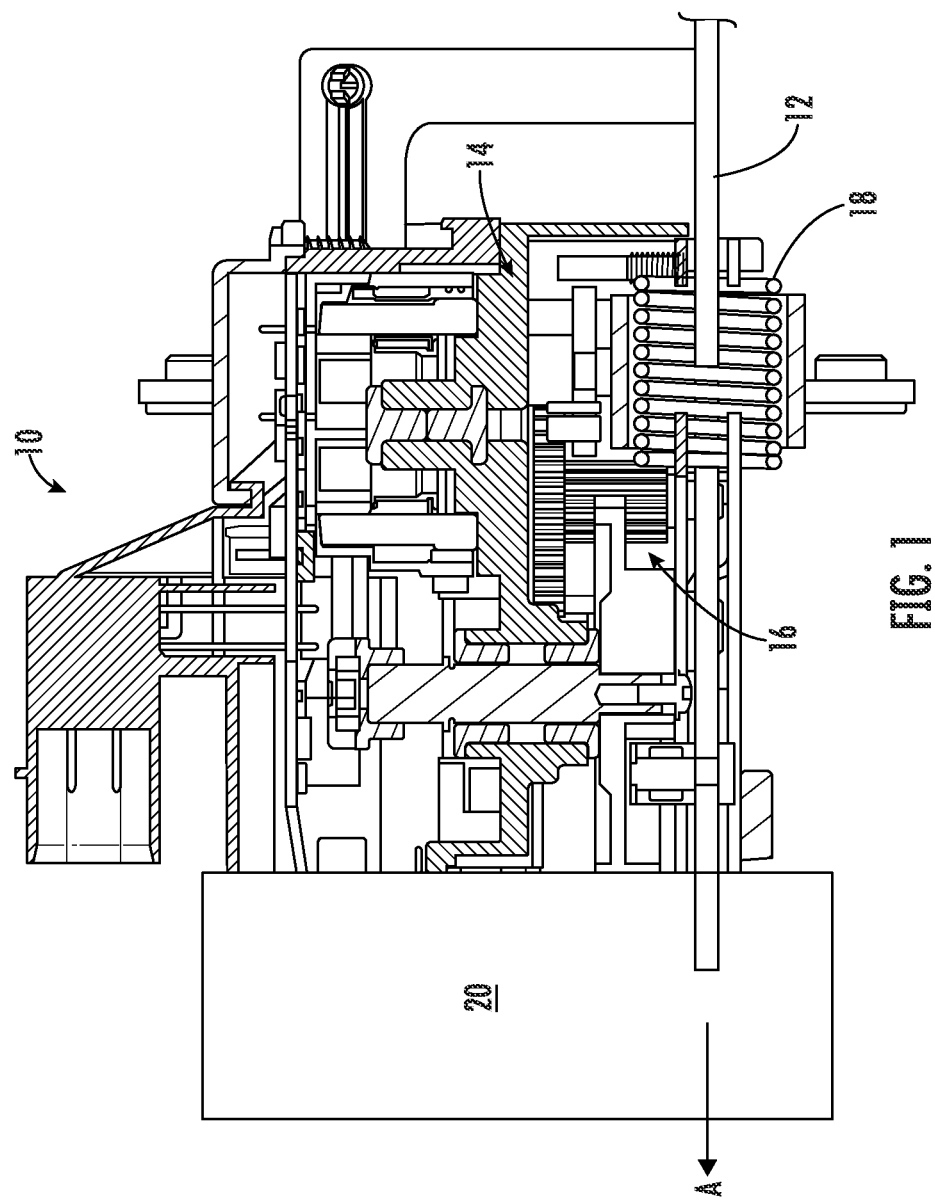
FIG. 1 is a cross-sectional view of an Integrated Park Module (IPM) in the Park position, consistent with the present disclosure.
Figure 2:
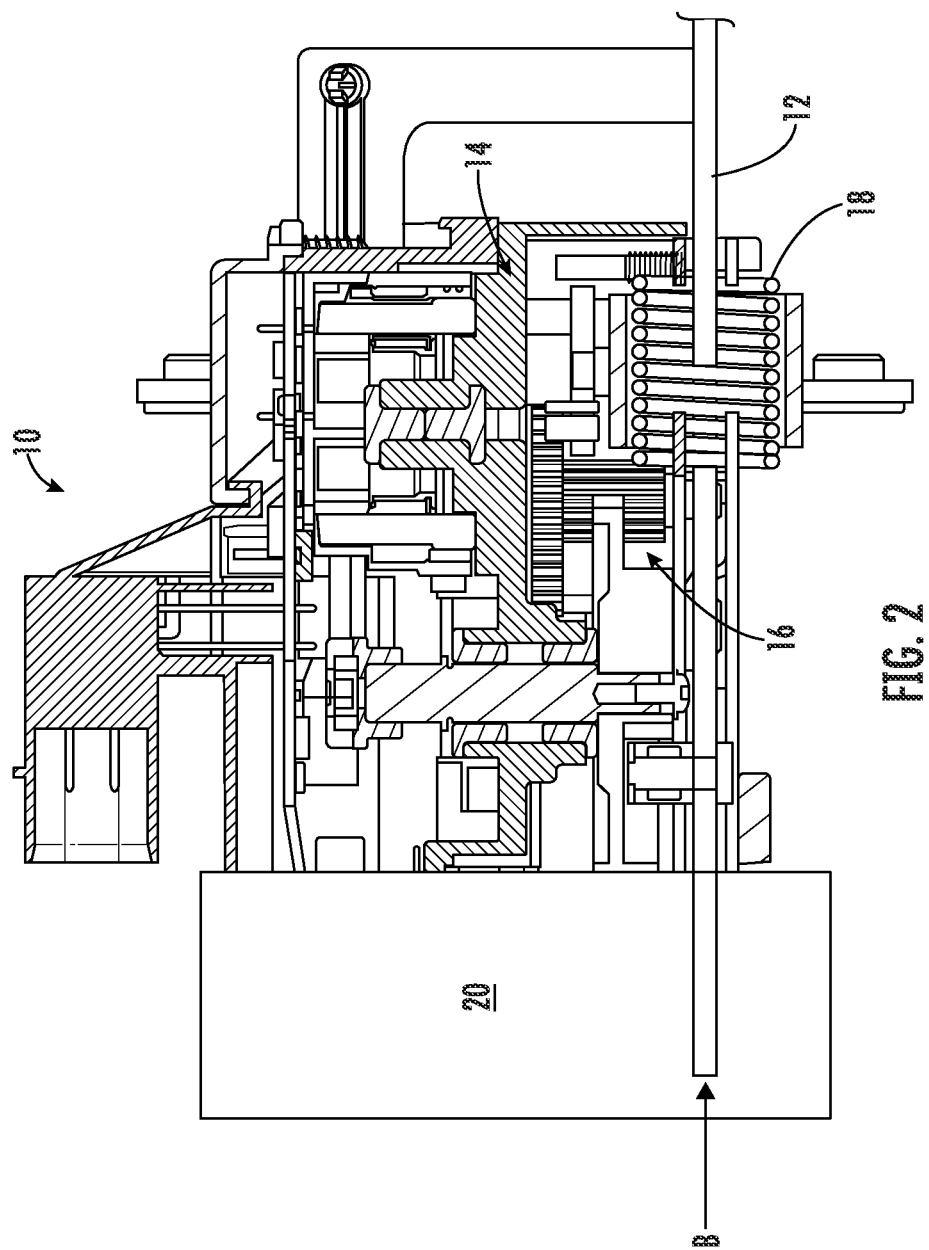
FIG. 2 is a cross-sectional view of the IPM of FIG. 1 in the Not-Park position, consistent with the present disclosure.

FIGS. 1 and 2 respectively illustrate a cross-sectional view an Integrated Park Module (IPM) 10 in the Park position and Not-Park position, respectively. The IPM 10 may include a slider 12 which is configured to move back and forth. The IPM 10 may also include a motor 14 coupled to a gear-train 16. When energized, the motor 14 may rotate the gear-train 16 to cause the slider 12 to move (e.g., generally in the direction of arrow A) from the Park position (FIG. 1) to the Not-Park position (FIG. 2). A spring 18 may be provided that urges the slider 12 from the Not-Park position (FIG. 2) to the Park position (FIG. 1), e.g., generally in the direction of arrow B.

As may be appreciated, the gear-train 16 may be configured such that it is disengaged from the slider when in the Not-Parked position such that the transmission may be automatically changed into the Park position in the event of a loss of power (e.g., electrical power) and/or a failure of the motor 14. The IPM 10 may include a Not-Park actuator system 20 configured to retain the slider 12 in the Not-Park position after the motor 14 and gear-train 16 have disengaged from the slider 12.

Figure 3:
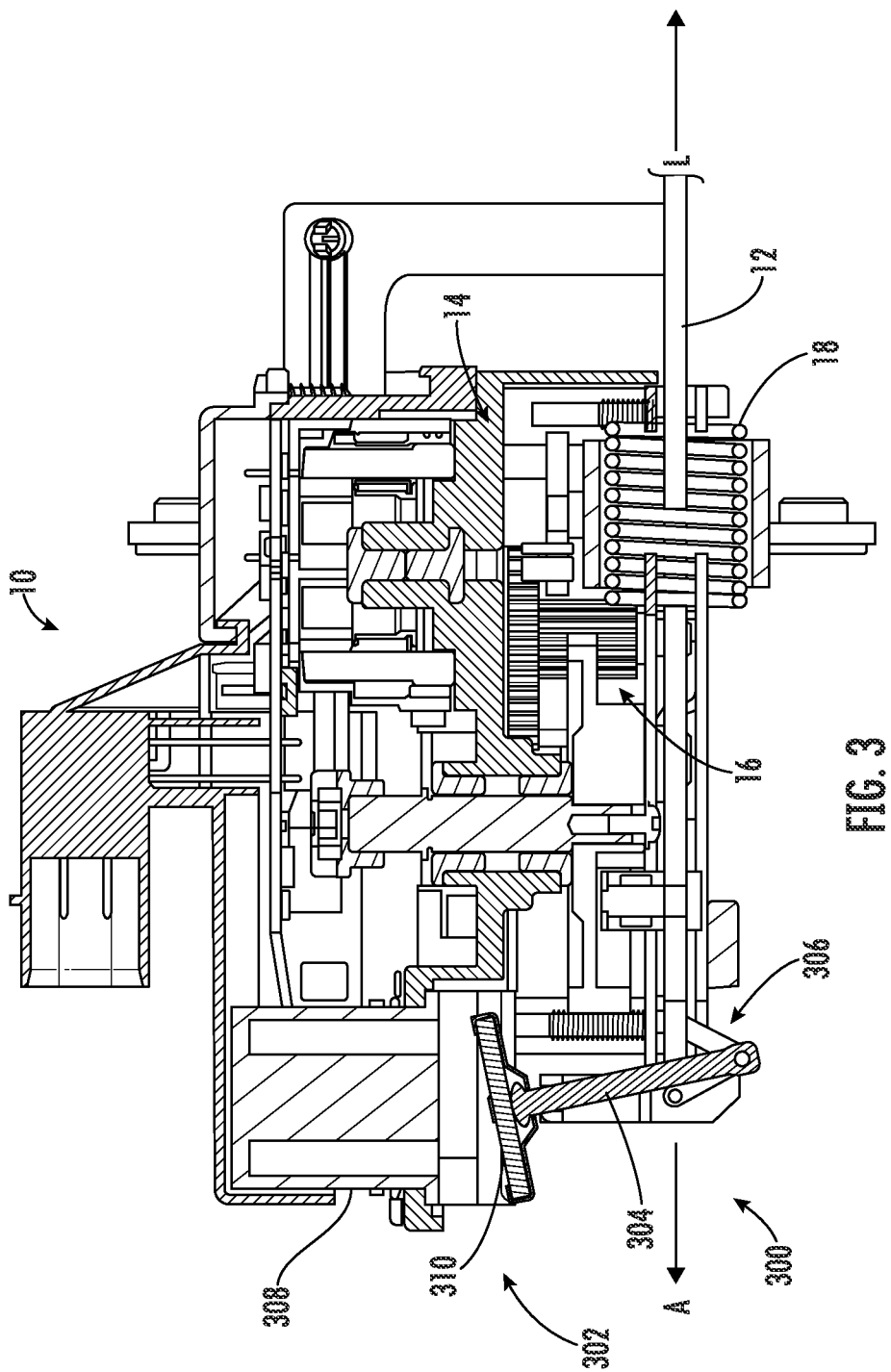
FIG. 3 is a cross-sectional view showing one example of an actuator system consistent with the present disclosure in combination with an IMP in the Park position.
Figure 4:
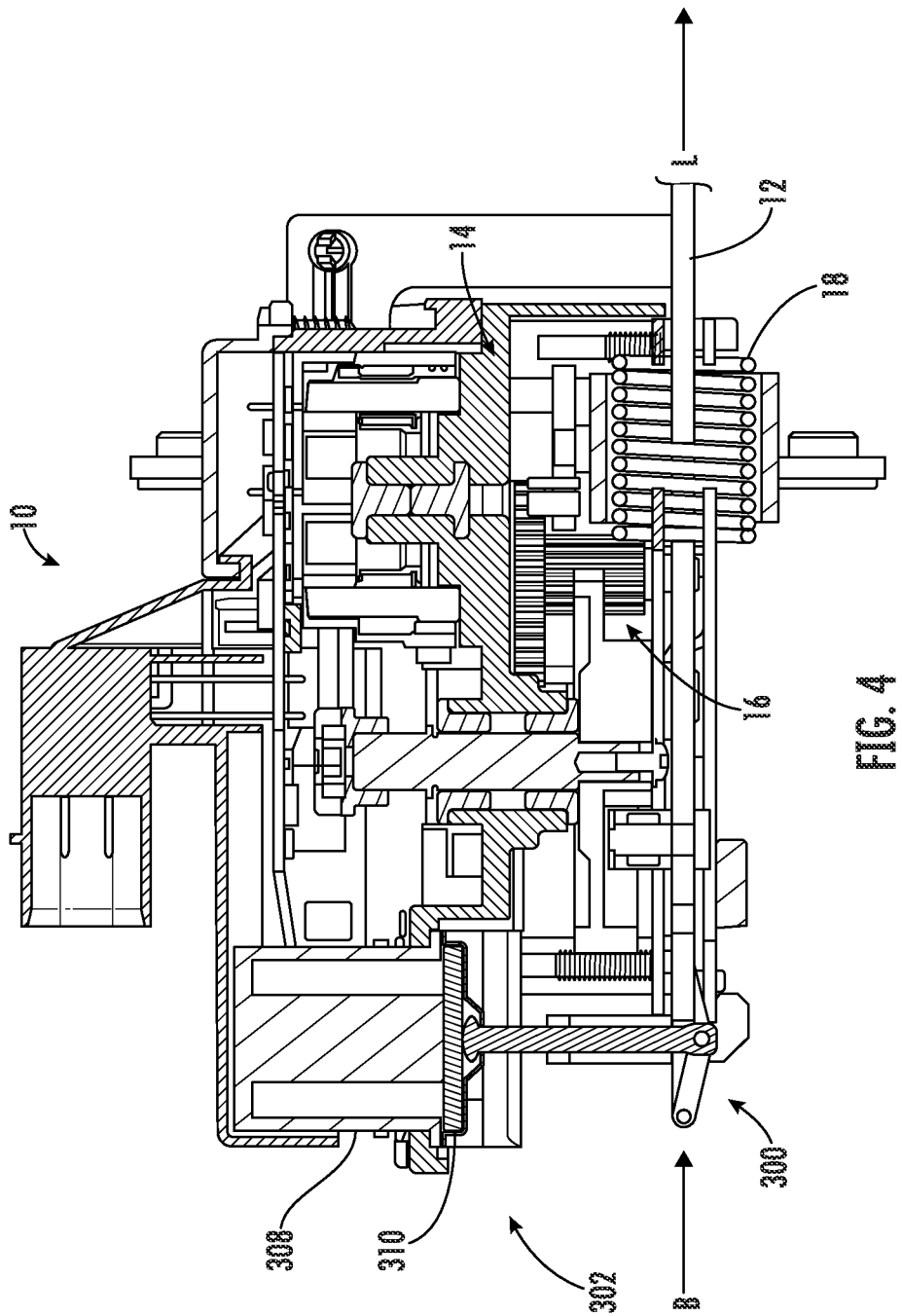
FIG. 4 is a cross-sectional view showing the actuator system of FIG. 3 in combination with the IMP in the Not-Park position.
Figure 5:
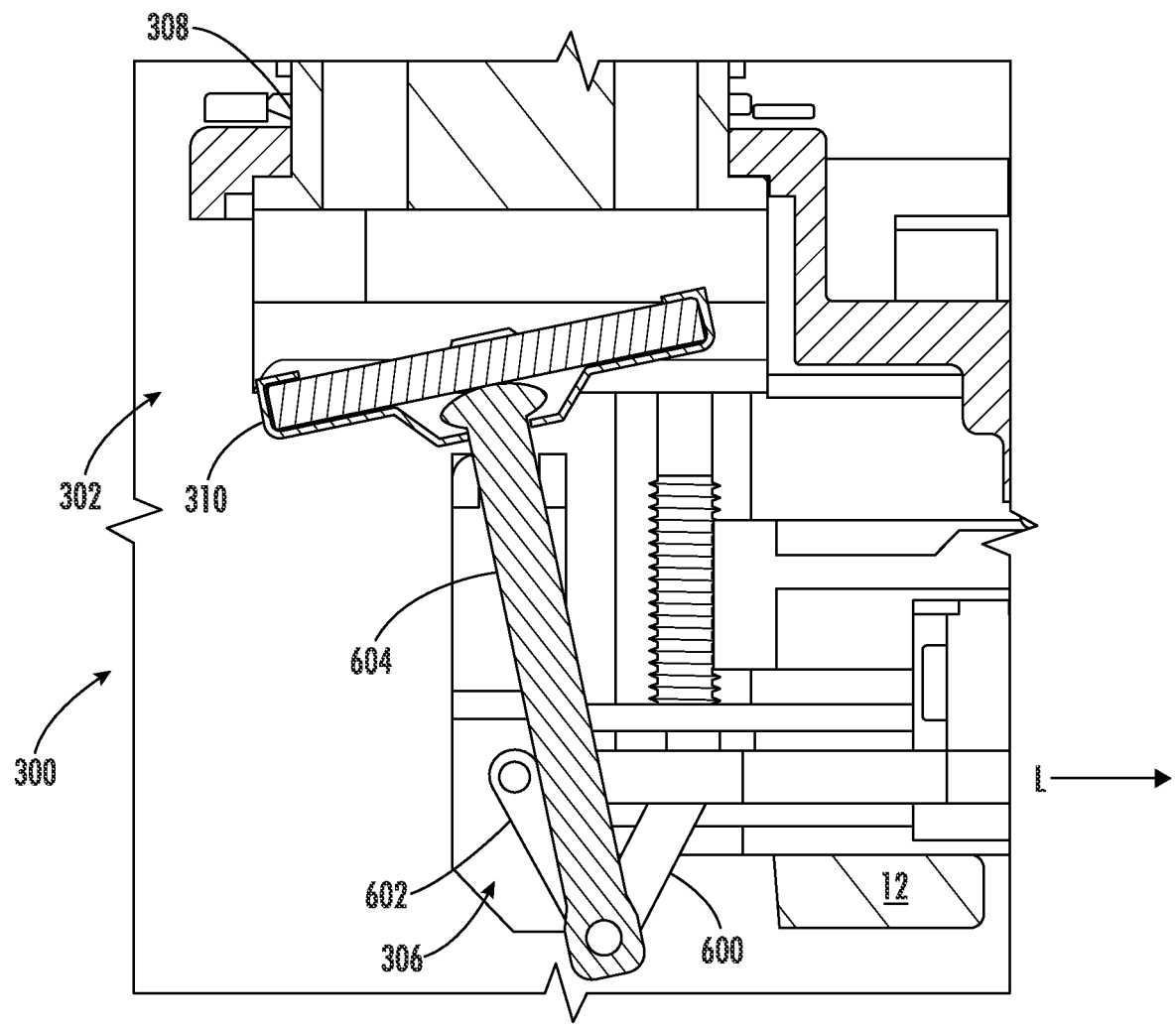
FIG. 5 is a cross-sectional view showing the actuator system of FIG. 3 in the Park position.
Figure 6:
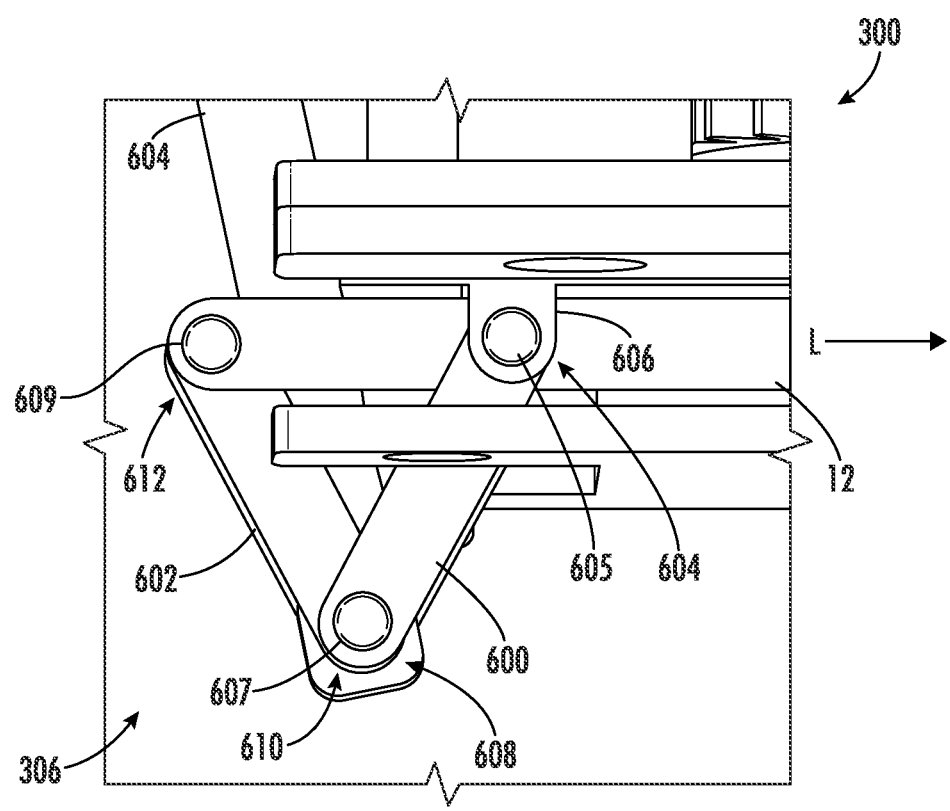
FIG. 6 is a close-up showing the actuator system of FIG. 5 in the Park position.
Figure 7:
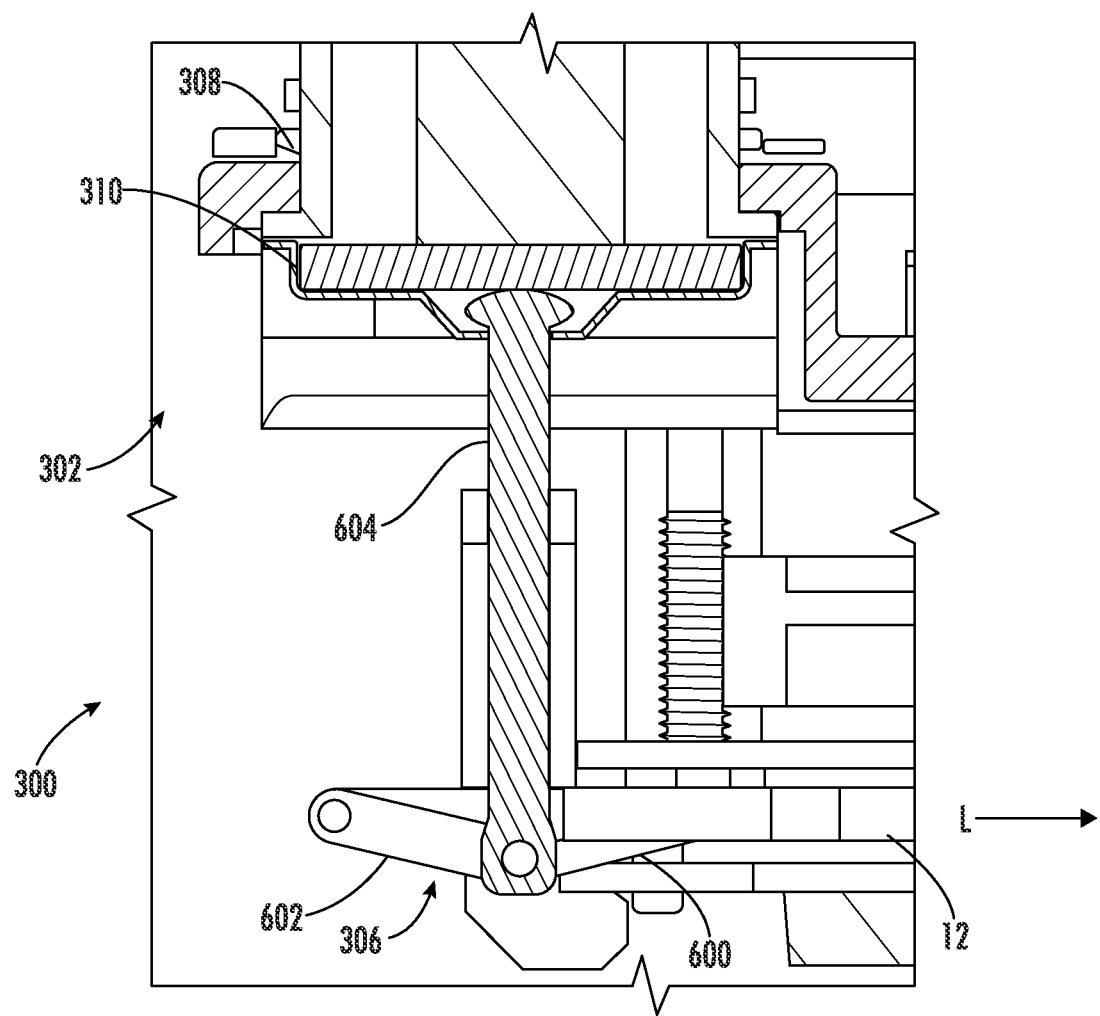
FIG. 7 is a cross-sectional view showing the actuator system of FIG. 4 in the Not-Park position.
Figure 8:
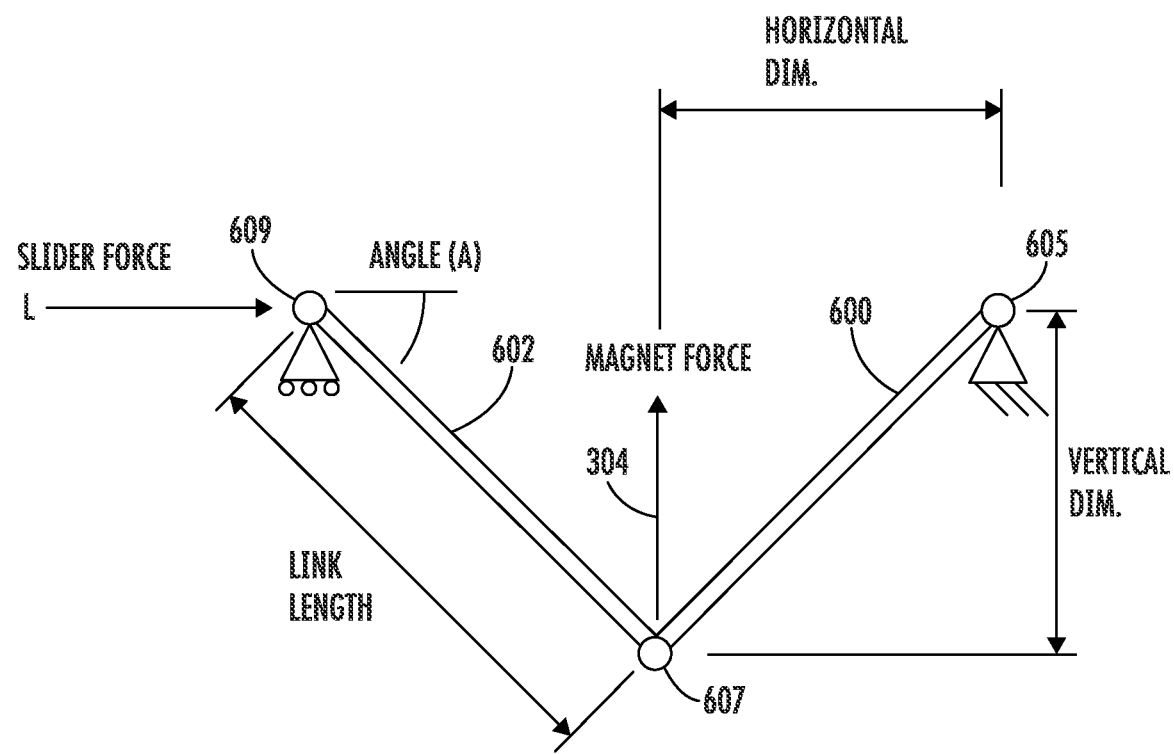
FIG. 8 schematically illustrates the actuator system of FIG. 3.

FIGS. 3-8 show various views of an actuator system 300, which may be an example of the actuator system 20 of FIGS. 1-2. In particular, FIG. 3 is a cross-sectional view showing the actuator system 300 in combination with an IMP 10 in the Park position, FIG. 4 is a cross-sectional view showing the actuator system 300 in combination with the IMP 10 in the Not-Park position, FIG. 5 is a cross-sectional view showing the actuator system 300 of FIG. 3 in the Park position, FIG. 6 is a close-up showing the actuator system 300 of FIG. 5 in the Park position, FIG. 7 is a cross-sectional view showing the actuator system 300 of FIG. 4 in the Not-Park position, and FIG. 8 schematically illustrates the actuator system 300 of FIG. 3.

With reference to these figures, the actuator system 300 may include a solenoid 302, a connecting rod 304 (also referred to as a solenoid shaft and/or plunger), and one or more dual pivoting link latch systems 306. The solenoid 302 may include an electromagnet 308 configured to attract/retain a ferrous plate 310 coupled to the connecting rod 304. For example, the electromagnet 308 may be configured to retain the ferrous plate 310 when energized such that the connecting rod 304 is substantially perpendicular to the slider 12, for example, as generally illustrated in FIGS. 4 and 7.

With reference to FIGS. 5 and 6, the dual pivoting link latch system 306 is shown in greater detail. The dual pivoting link latch system 306 may include a first converting link 600 and a second converting link 602 arranged to form a generally triangle configuration (e.g., an over-center linkage latch). The first converting link 600 includes a first end region 604 which is pivotally coupled to a fixed pivot 605. The fixed pivot 605 may be secured to a support plate 606 or the like which does not move relative to the slider 12 (i.e., the fixed pivot 605 and the support plate 606 are stationary with respect to the actuator system 300 and the slider 12 moves). A second end region 608 of the first converting link 600 (which may be generally opposite to the first end region 604) may be pivotally coupled to a first end region 610 of the second converting link 602 about a rotating pivot 607. The rotating pivot 607 may also be pivotally coupled to the connecting rod 604. A second end region 612 of the second converting link 602 (which may be generally opposite to the first end region 610) may be pivotally coupled to the slider 12 about a sliding pivot 609. The fixed pivot 605 may be aligned with the sliding pivot 609 to define a line which is generally parallel to the longitudinal axis L of the slider 12 and/or to the return force generated by the spring 18 on the slider 12. For example, the fixed pivot 605 and the sliding pivot 609 may be aligned colinearly with the longitudinal axis L of the slider 12 and/or to the return force generated by the spring 18 on the slider 12. While the actuator system 300 is illustrated having two dual pivoting link latch systems 306 flanking the slider 12, it should be appreciated that the actuator system 300 may include a single dual pivoting link latch system 306 (e.g., on only one side of the slider 12). It should also be appreciated that the first and the second converting links 600, 602 may have substantially the same length (e.g., the distance between the fixed pivot 605 and the rotating pivot 607 may be substantially the same as the distance between the sliding pivot 609 and the rotating pivot 607) or different lengths.

In practice, the IPM 10 may be moved from the Park position to the Not-Park position by energizing the motor 14 and causing the gear-train 16 to move the slider 12 generally in the direction of arrow A. Once the slider 12 has approximately reached its maximum travel distance, the electromagnet 308 may be energized to retain the ferrous plate 310 such that the connecting rod 304 is substantially perpendicular to the slider 12. With reference to FIG. 8, the electromagnet 308 may generate a magnet force with the ferrous plate 310 which may be generally perpendicular to the longitudinal axis L of the slider 12 and/or to the return force generated by the spring 18 on the slider 12. This magnetic force is transferred to the rotating pivot 607 of the first and second converting links 600, 602 via the connecting rod 304.

An angle A may be formed at the sliding pivot 609 between the second converting link 602 and the longitudinal axis L of the slider 12 and/or to the return force generated by the spring 18 on the slider 12. The retaining force holding the slider 12 in the Not-Park position is a function the electromagnetic force generated between the electromagnet 308 and the ferrous plate 310, the lengths of the first and second converting links 600, 602, and the angle A. The angle A may be in the range of 40 to 80 degrees (e.g., but not limited to, 62.1 degrees) when the IPM 10 is in the Park position, and in the range of greater than 0 degrees to 35 degrees (e.g., but not limited to, 13.5 degrees) when the IPM 10 is in the Not-Park position. As angle A decreases in the Not-Park position, the amount of force required by the electromagnet 308 to retain the slider 12 in the Not-Park position also decreases; however, angle A is preferably greater than 0 degrees when the IPM 10 is in the Not-Park position such that the spring 18 may automatically move the slider 12 in the direction of arrow B when the electromagnet 308 is de-energized. By way of a non-limiting example, the spring 18 may generate 116.3 N drivetrain spring load in not-Park position, the electromagnet 308 and ferrous plate 310 may generate 27.9 N plunger force in not-Park position, the Min magnetic hold force may be 95.7 N at 9 Vdc, 120° C., and the plunger (e.g. ferrous plate 310) may travel vertically 7.1 mm in total. As may therefore be appreciated, the low-force electromagnet 308 may be utilized to retain the slider 12 in the Not-Park position. The low-force electromagnet 308 may be smaller than the known designs, thereby reducing the overall size of the actuator system 300. In addition, the low-force electromagnet 308 may be less expensive compared to the known designs.

Figure 9:
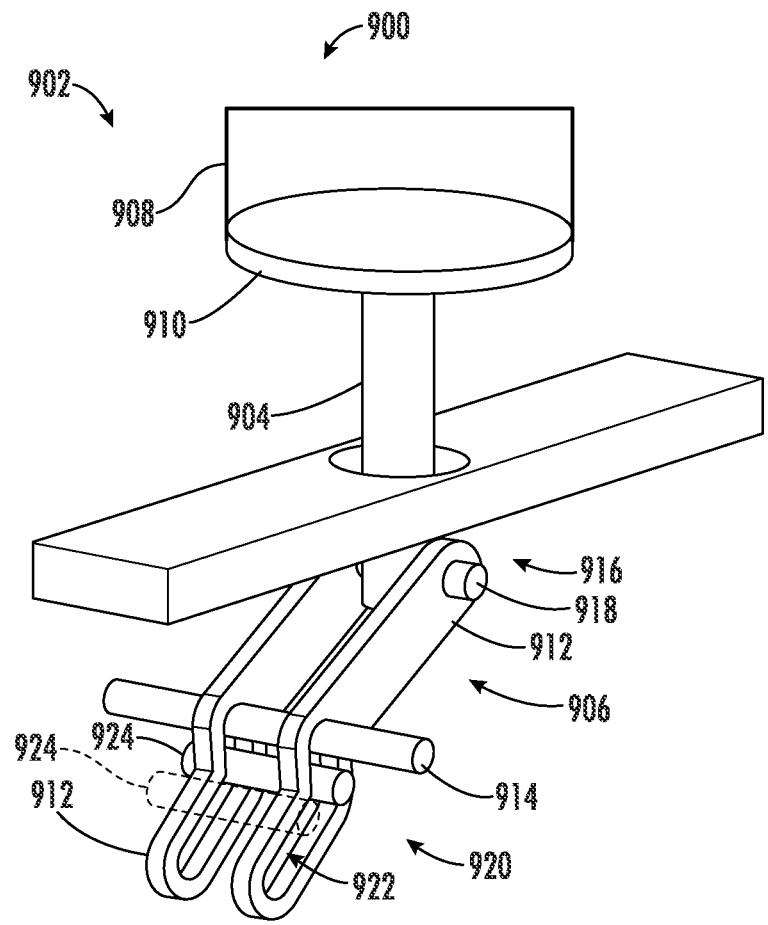
FIG. 9 is a perspective view showing one example of an actuator system consistent with the present disclosure in the Not-Park position.
Figure 10:
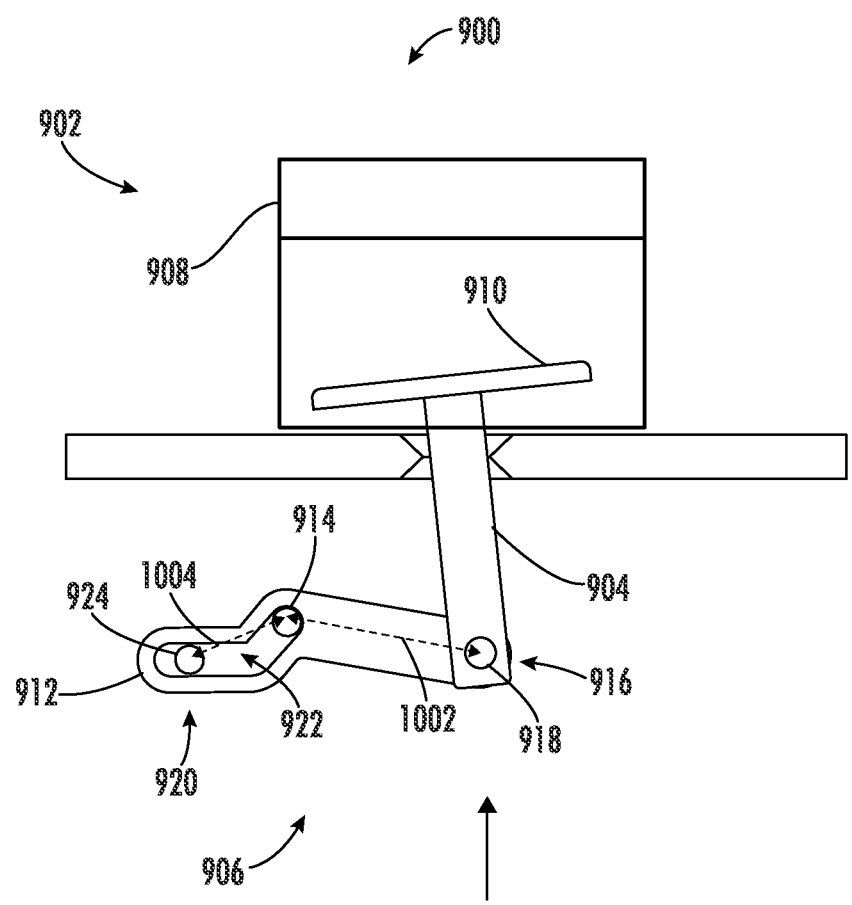
FIG. 10 is a side view showing the actuator system of FIG. 9 in the Park position.
Figure 11:
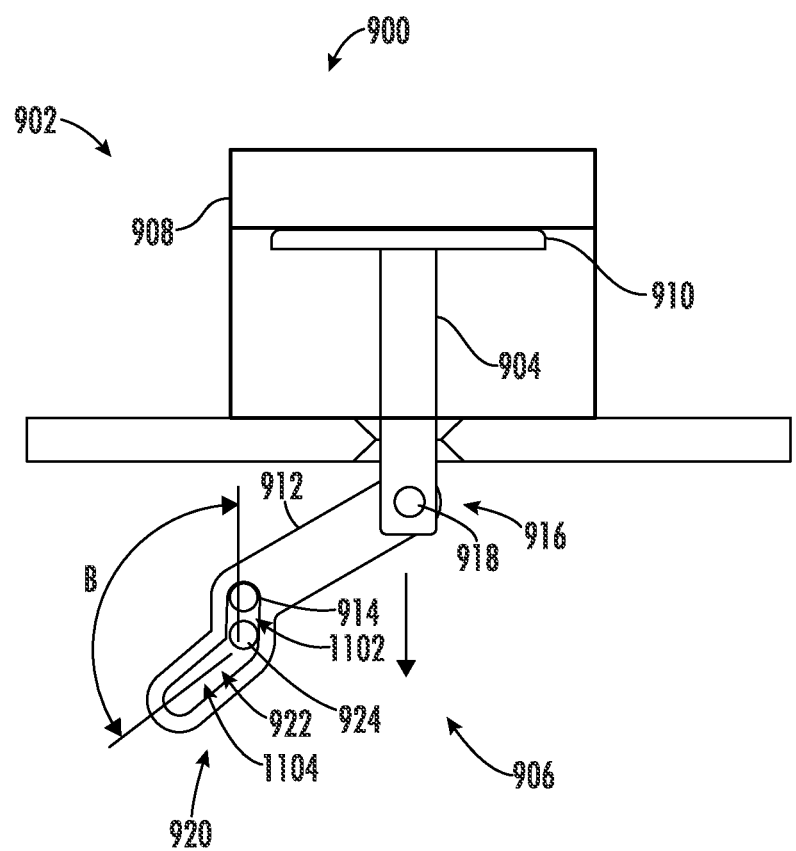
FIG. 11 is a side view showing the actuator system of FIG. 9 in the Not-Park position.
Figure 12:
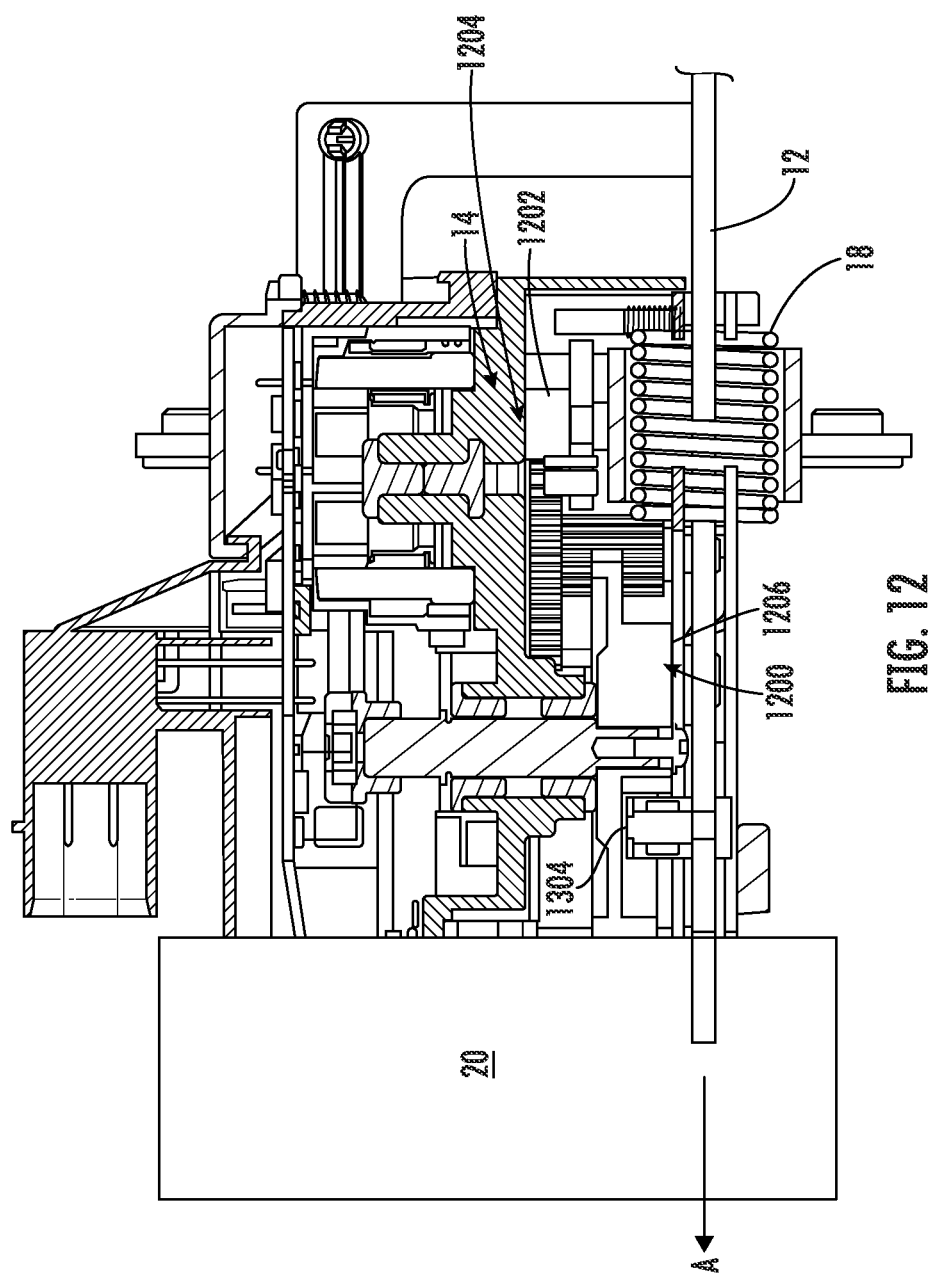
FIG. 12 is a cross-sectional view of one example of a gear train in combination with an IPM in the Park position.

Turning now to FIGS. 9-11, various views of an actuator system 900 are shown which may be an example of the actuator system 20 of FIGS. 1-2. In particular, FIG. 9 is a perspective view of the actuator system 900 in the Not-Park position, FIG. 10 is a side view showing the actuator system 900 of FIG. 9 in the Park position, and FIG. 11 is a side view showing the actuator system 900 of FIG. 9 in the Not-Park position.

With reference to these figures, the actuator system 900 may include a solenoid 902, a connecting rod 904 (also referred to as a solenoid shaft and/or plunger), and one or more bell crank latch systems 906. The solenoid 902 may include an electromagnet 908 configured to attract/retain a ferrous plate 910 coupled to the connecting rod 904. For example, the electromagnet 908 may be configured to retain the ferrous plate 910 when energized such that the connecting rod 904 is substantially perpendicular to the slider 12.

The bell crank latch systems 906 may include a first and a second rigid link 912. As described herein, the links 912 may pivot about a fixed pivot 914 and include a first end region 916 pivotally coupled to the connecting rod 904 about a rotating pivot 918 and a second end region 920 including a slot or groove 922. A slider-connecting rod or the like 924 is coupled to the slider 12 and is configured to move within the slot 922 to allow the slider 12 to move between the Not-Park position (FIGS. 9 and 11) and the Park position (FIG. 10). The slider 12 (not shown) is coupled to the slider-connecting rod 924 such that movement of the slider 12 in the direction of arrows A and B results in movement of the slider-connecting rod 924 between the Not-Park position and the Park position.

The fixed pivot 914 may be secured to a support plate or the like (not shown) which does not move relative to the slider 12 (i.e., the fixed pivot 914 and the support plate are stationary with respect to the actuator system 900 and the slider 12 moves). In the illustrated example, the fixed pivot 914 is shown within the slot 922; however, it should be appreciated that this is not a limitation of the present disclosure unless specifically claimed as such. The slot 922 may be configured to generally prevent up/down movement of the slider-connecting rod 924 relative to the slider 12 as the actuator system 900 moves between the Park position and the Not-Park position (i.e., the slot 922 may be formed such that the slider-connecting rod 924 moves in a direction generally parallel to the movement of the slider 12 as the actuator system 900 cycles between the Park position and the Not-Park position). In some examples, the slot 922 may have a dog-leg shape including a short portion 1102 (FIG. 11) and a long portion 1104 arranged at an angle B. The short portion 1102 may be shorter than the long portion 1104 and may be disposed closer to the fixed pivot 914 than the long portion 1104 is to the fixed pivot 914. The angle B may control the distance that the links 912 move between the Park position and the Not-Park position. The angle B may be within the range of 10 degrees to 90 degrees, for example, within 30 degrees to 45 degrees. While the short portion 1102 and the long portion 1104 are illustrated as liner portions, it should be appreciated that these portions 1102, 1104 may include an arcuate slot having a non-continuous radius of curvature.

As describe herein, the IPM 10 may be moved from the Park position to the Not-Park position by energizing the motor 14 and causing the gear-train 16 to move the slider 12 generally in the direction of arrow A. Once the slider 12 has approximately reached its maximum travel distance, the electromagnet 908 may be energized to retain the ferrous plate 910 such that the connecting rod 904 is substantially perpendicular to the slider 12. With reference to FIG. 11, the electromagnet 908 may generate a magnet force with the ferrous plate 910 which may be generally perpendicular to the longitudinal axis L of the slider 12 and/or to the return force generated by the spring 18 on the slider 12. This magnetic force is transferred to the rotating pivot 918 via the connecting rod 904.

The links 912 may rotate about the fixed pivot 914 at a position closer to the second end region 920 than the first end region 916 and the slot 922 may extend in a region between the fixed pivot 914 and the distal most portion of the second end region 920. As such, the distance 1002 (FIG. 10) between the rotating pivot 918 and the fixed pivot 914 is greater than the distance 1004 between the fixed pivot 914 and the distal most end of the slot 922. Because distance 1002 is larger than distance 1004, a mechanical advantage is generated which allows for a lower force electromagnet 908 to be used to retain the slider 12 in the Not-Park position compared to known designs.

While the actuator system 900 is illustrated having two links 912 flanking the slider 12, it should be appreciated that the actuator system 900 may include a single link 912 (e.g., on only one side of the slider 12).

Figure 13:
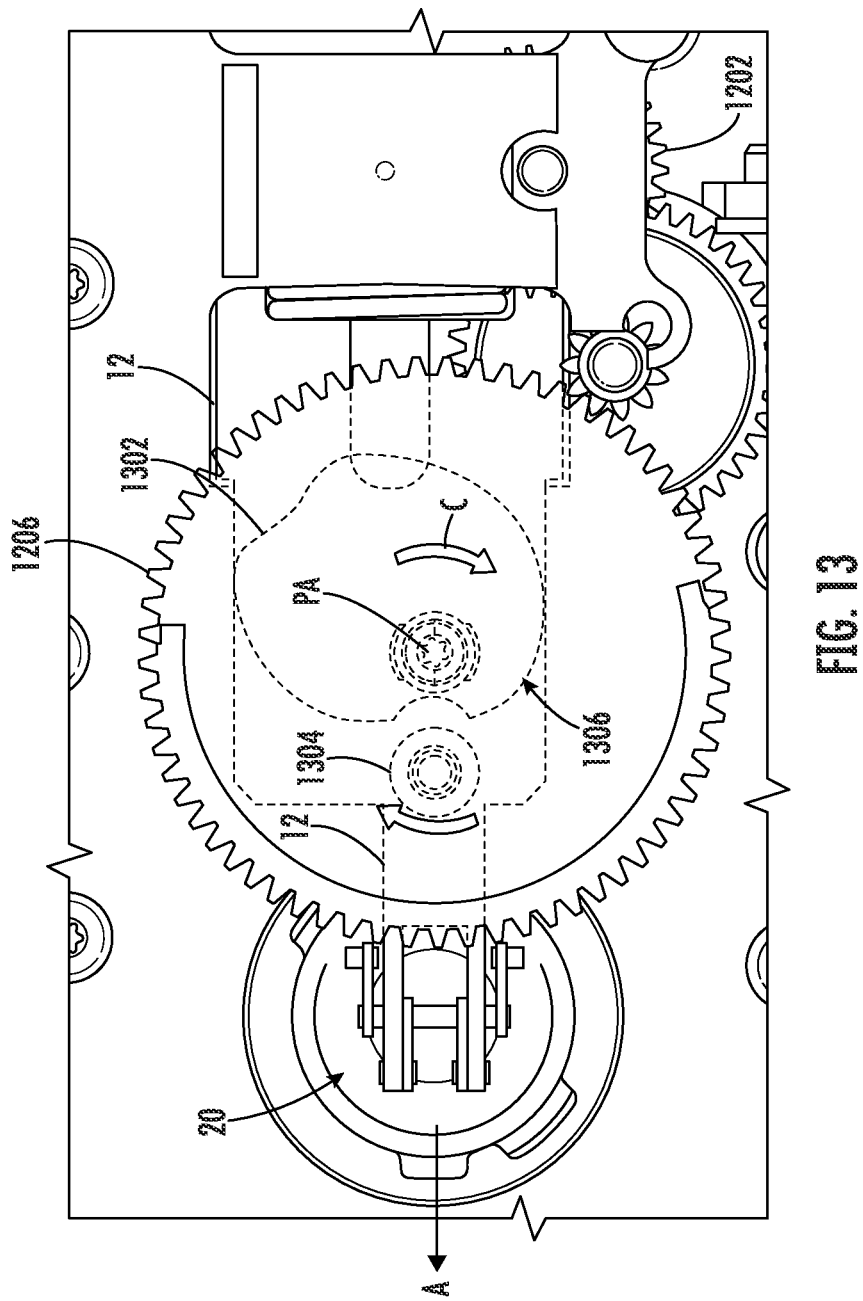
FIG. 13 is a partially transparent view of the gear train of FIG. 12 in the Park position.
Figure 14:
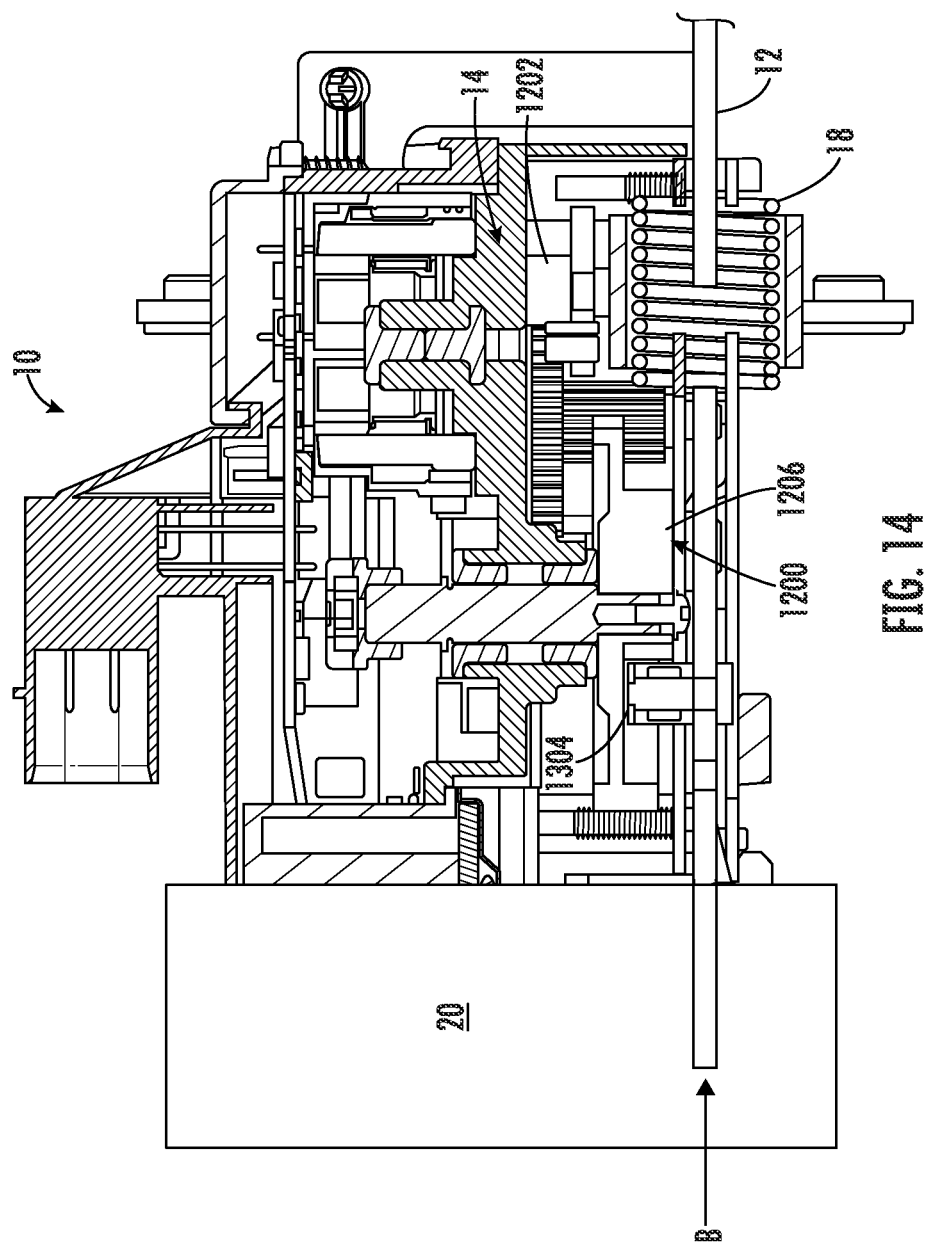
FIG. 14 is a cross-sectional view of one example of a gear train of FIG. 12 in combination with IPM in the Not-Park position.
Figure 15:
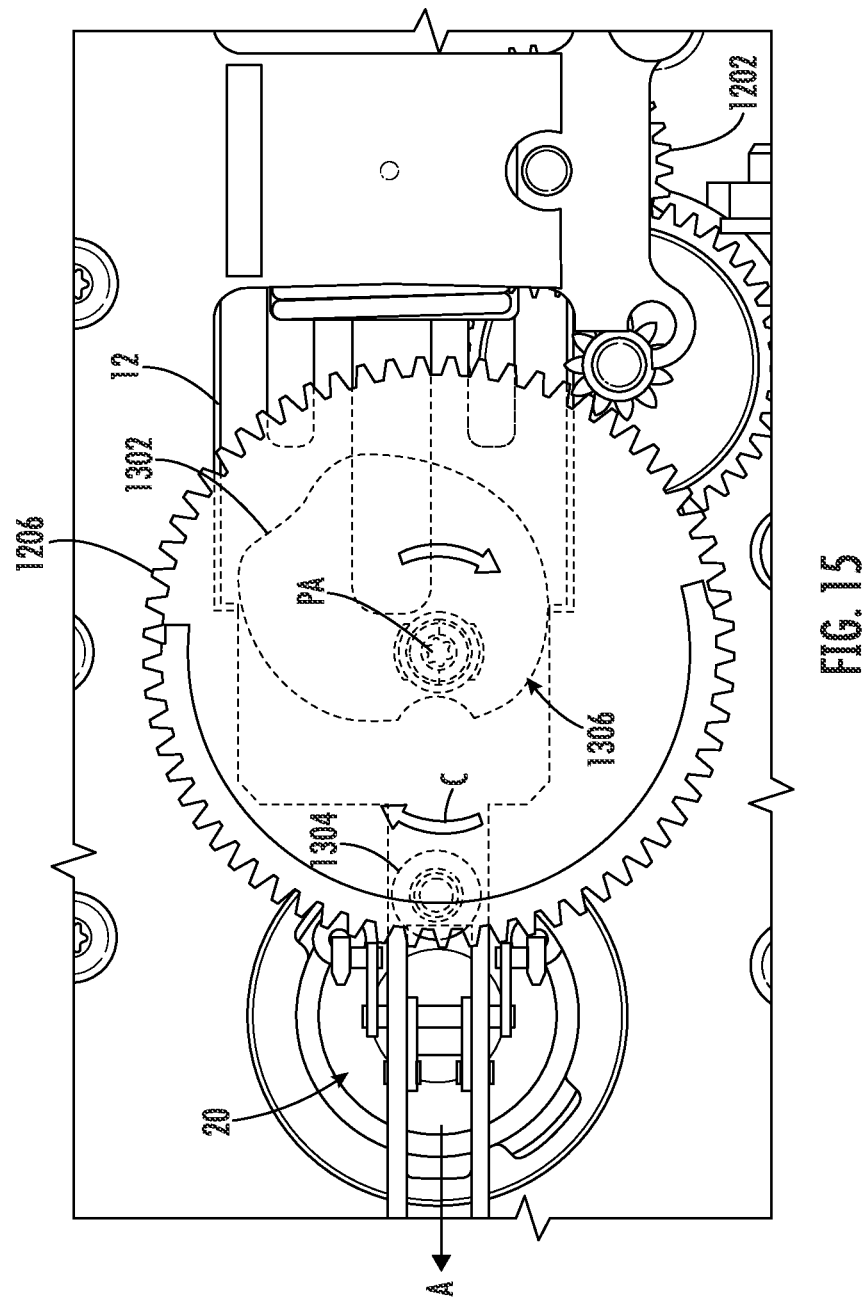
FIG. 15 is a partially transparent view of the gear train of FIG. 14 in the Not-Park position.

Turning now to FIGS. 12-20, various figures are provided of a gear-train 1200 which may be an example of the gear-train 16 of FIGS. 1-2. As noted herein, the gear-train 1200 is configured to urge the slider from the Park Position (FIGS. 12 and 13) to the Not-Park Position (FIGS. 14 and 15). In particular, a motor 14 may rotate a pinon gear 1202, which in turn may rotate one or more reduction gears 1204. A cam 1302 (FIG. 13) may be configured to rotate with the output reduction gear 1206. The cam 1302 may be secured to or part of the output reduction gear 1206 (e.g., the cam 1302 may be integral with the output reduction gear 1206). The cam 1302 may rotate about an off-center pivot axis PA and may be configured to engage against and urge a slider post 1304 in the direction of arrow A from the Park position towards the Not-Park position. The slider post 1304 may be coupled to the slider 12 such that movement of the slider post 1304 in the direction of arrow A also results in movement of the slider 12 in the direction of arrow A. The slider post 1304 may include a roller follower configured to reduce the friction of converting the rotary motion of the cam 1302 into linear motion of the slider post 1304.

With reference to FIGS. 13 and 15, the cam 1302 may include a home or default position which is configured to allow the slider post 1304 (and consequently the slider 12) to move to the Park position. As explained herein, when the IPM 10 is in the Park position (FIGS. 12 and 13), the cam 1302 is configured to allow the slider post 1304 to physically be in the Park position, whereas when the IPM 10 is in the Not-Park position (FIGS. 14 and 15), the slider post 1304 is in Not-Park position but the cam 1302 is configured to allow the slider post 1304 to move from the Not-Park position to the Park position without the rotation of the cam 1302 (i.e., the cam 1302 is not preventing the slider post 1304 from being in the Park position, but rather only the actuator system 20 is retaining the slider post 1304 in the Not-Park position).

The cam 1302 may include a cam surface 1306 having a curvature configured such that rotation of the cam 1302 about the off-center pivot axis PA causes the cam surface 1306 to engage the slider post 1304 and urge the slider post 1304 in the direction of arrow A. The cam surface 1306 may include a maximum cam lift point or maximum cam lift region.

The maximum cam lift point corresponds to the point on the cam surface 1306 which results in the cam 1302 moving the slider post 1304 the furthest in the direction of arrow A (e.g., further from the Park Position). Similarly, the maximum cam lift region corresponds to a range of points on the cam surface 1306 which results in the slider post 1304 moving the furthest in the direction of arrow A. For example, the maximum cam lift region may include an initial maximum lift point, followed by either region of constant lift or a reduction in the lift followed by another increase in the lift. The maximum cam lift point and/or the initial maximum lift point of the cam 1302 may occur at an angle of rotation of the cam 1302 (i.e., a maximum lift angle of rotation) that is greater than 180 degrees from the home or default position. For example, the maximum lift angle of rotation may occur at greater than 200 degrees from the home or default position. In at least one example, the maximum lift angle of rotation may occur at an angle of approximately 230 degrees from the home or default position.

Figure 18:
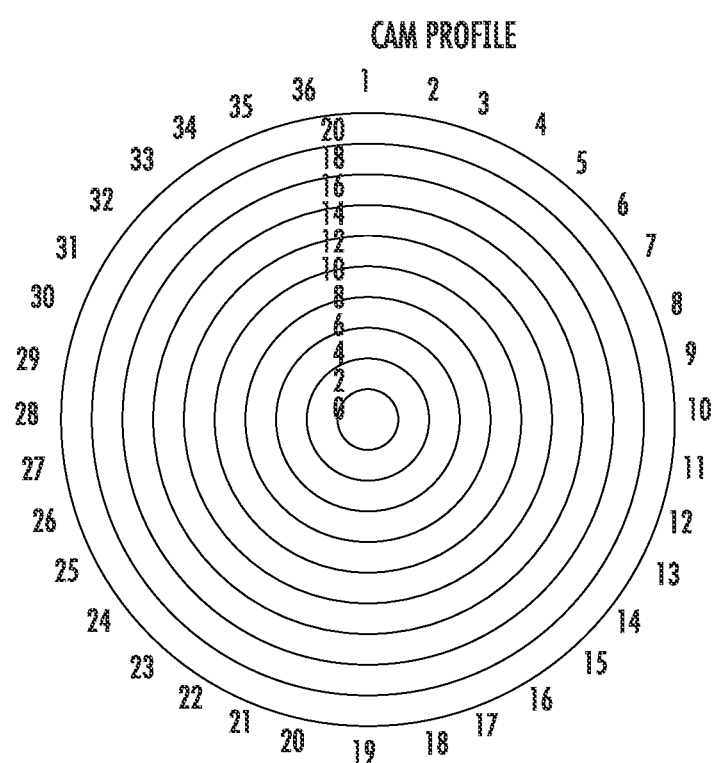
FIG. 18 is a polar plot of one example of a cam profile consistent with the present disclosure.
Figure 19:
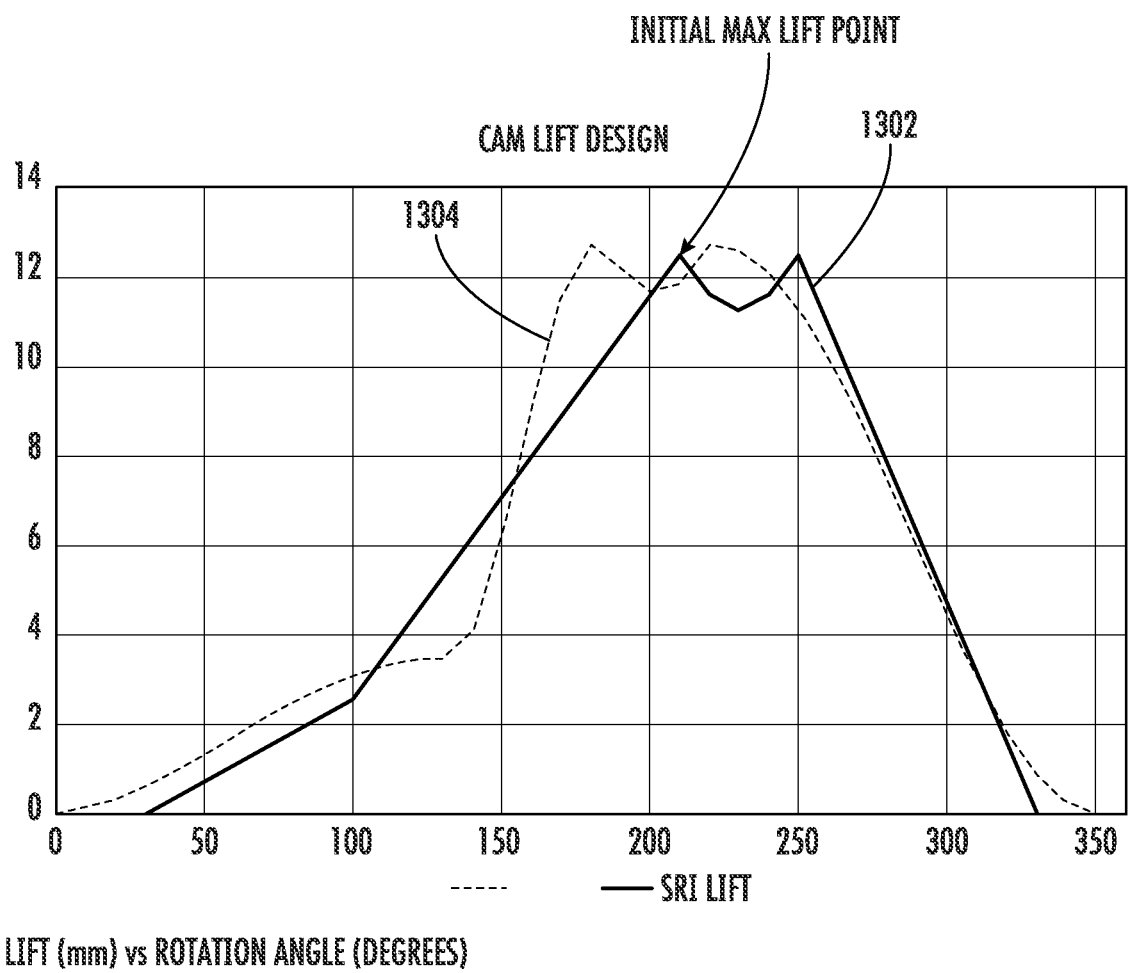
FIG. 19 is a graph of cam lift vs. rotation angle of the cam profile of FIG. 18 compared with a known cam design.
Figure 20:
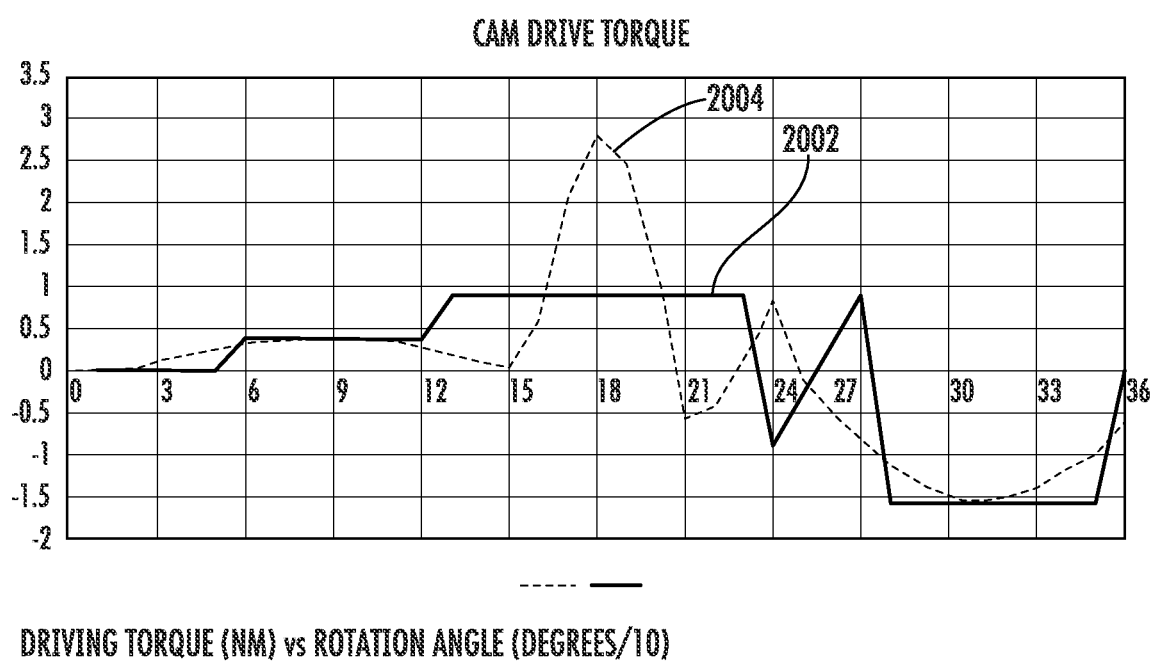
FIG. 20 is a graph of driving torque vs. rotation angle of the cam profile of FIG. 18 compared with a known cam design.

A non-limiting example of a polar plot of the profile of the cam 1302 is generally illustrated in FIG. 18. A non-limiting example of a plot 1902 illustrating one example of the lift of the cam 1302 of the present disclosure versus rotation angle of the cam 1302 compared to a plot 1904 of the lift of a known cam design is generally illustrated in FIG. 19. In addition, a non-limiting example of a plot 2002 of the driving torque vs rotation angle of the cam 1302 of the present disclosure compared to a plot 2004 of a known cam design is generally illustrated in FIG. 20. As can be seen, utilizing a maximum lift angle of rotation that is greater than 180 degrees reduces the driving torque of the motor 14 required to move the slider 12 from the Park position to the Not-Park position. As a result, a lower torque motor 14 may be used compared to known designs. The lower torque motor 14 may be less expensive and/or smaller.

Figure 16:
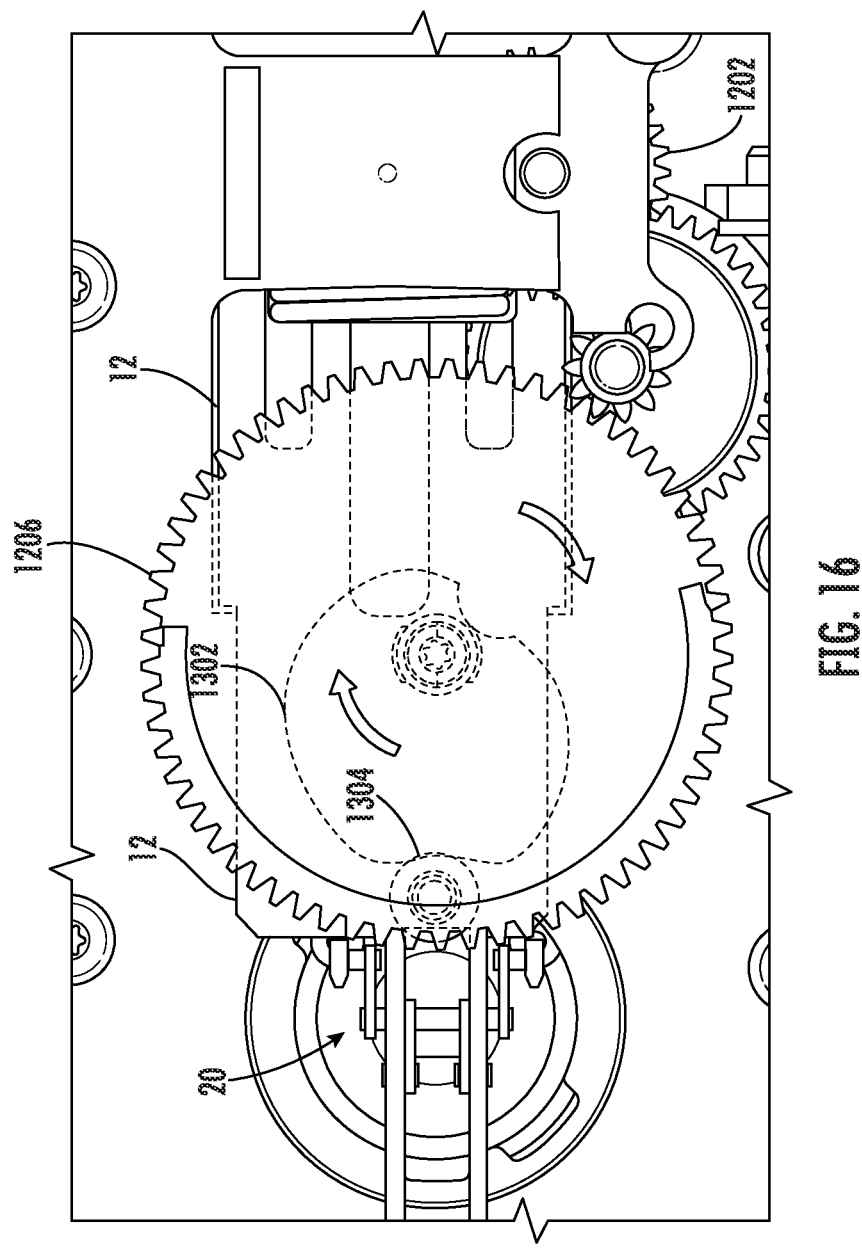
FIG. 16 is a partially transparent view of the gear train of FIGS. 12-15 in the Stay-Out-Of-Park position.
Figure 17:
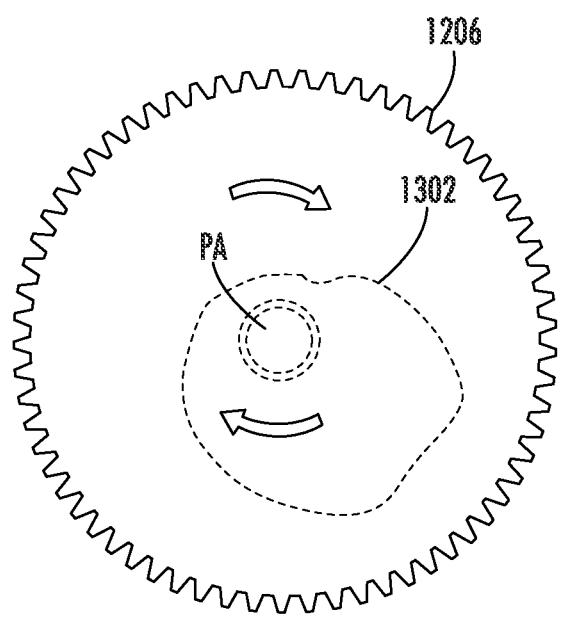
FIG. 17 is a plan view of the cam of FIGS. 12-15.

In response to the cam 1302 rotating to the maximum cam lift point and/or the initial maximum lift point of the cam 1302, the actuator system 20 may retain the slider 12 in the Not-Park position as described herein. Once the actuator system 20 retains the slider 12 in the Not-Park position, the cam 1302 may continue to rotate back to the home or default position. With reference to FIG. 16, the cam 1302 may optionally include a Stay-Out-Of-Park position. In particular, the Stay-Out-Of-Park position may allow the IPM 10 to ensure that the transmission remains out of park, for example when towing the vehicle. The Stay-Out-Of-Park position may correspond to the maximum cam lift region described above. The Stay-Out-Of-Park position may correspond to the base of the maximum cam lift region (i.e., after the initial maximum lift point of the cam 1302 and before a secondary maximum lift point of the cam 1302).

The present disclosure may also feature an IPM 10 including one or more printed circuit boards (PCBs) that are sealed by over-molding. In particular, the IPM 10 may include a PCB which is exposed to automatic transmission fluid (ATF). The known designs use a conformal coating to seal the PCB; however, conformal coating a PCB is expensive. The present disclosure may replace the expensive conformal coating with an inexpensive overmolding process. The overmolding of the PCB may utilize any material having a melt temperature that is compatible with the PCB and is resistant to ATF. Non-limiting examples of such materials include nylons.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary. The term "substantially" as used herein should be understood to mean+/−10%, unless noted otherwise.

What is claimed is:

1. A shift-by-wire system comprising:
   an integrated park module (IPM) comprising:
   a slider configured to be disposed in a park position and a not-parked position corresponding to a park mode and a not-park mode of a transmission, respectively;
   a motor coupled to a gear-train to cause said slider to move from said park position to said not-parked position;
   a spring configured to urge said slider from the not-parked position to the park position; and
   an actuator system configured to retain said slider in said not-park position after said motor and said gear-train have disengaged from said slider, wherein said actuator system comprises:
   a ferrous plate;
   a connecting rod having a first end coupled to said ferrous plate;
   a solenoid comprising an electromagnet configured to attract said ferrous plate and retain said slider in said not-park position; and
   linkage having a first end pivotally coupled to a second end of said connecting rod and a second end coupled to said slider.

2. The shift-by-wire system of claim 1, wherein said linkage comprises a pivoting link latch system.

3. The shift-by-wire system of claim 1, wherein said said linkage comprises a dual pivoting link latch system coupled to said slider.

4. The shift-by-wire system of claim 3, wherein said a second end of said connecting rod is pivotally coupled to said dual pivoting link latch system.

5. The shift-by-wire system of claim 1, wherein said linkage comprises a bell crank latch system.

6. The shift-by-wire system of claim 5, wherein said second end of said connecting rod is pivotally coupled to said bell crank latch system.

7. The shift-by-wire system of claim 1, wherein said gear-train is configured to urge said slider from said park position to said not-park position against a spring force of said spring.

8. The shift-by-wire system of claim 7, wherein said gear-train includes a plurality of reduction gears.

9. The shift-by-wire system of claim 1, further comprising said transmission.

10. A shift-by-wire system comprising:
    an integrated park module (IPM) comprising:
    a slider configured to be disposed in a park position and a not-parked position corresponding to a park mode and a not-park mode of a transmission, respectively;
    a spring configured to urge said slider from the not-parked position to the park position;
    a motor coupled to a gear-train to cause said slider to move from said park position to said not-parked position, wherein said gear-train includes a cam configured to rotate and engage a follower associate with said slider to urge said slider from said park position to said not-park position against a spring force of said spring, said cam having a maximum lift region which, when disposed at an angle of rotation of said cam that is greater than 180 degrees from initial contact with said follower, allows said actuator system to retain said slider in said not-park position; and an actuator system configured to retain said slider in said not-park position after said motor and said gear-train have disengaged from said slider;

wherein when said IPM is in the park position, said gear-train is configured to allow said slider to physically be in said park position, whereas when said IPM is in said not-park position, said slider is in said not-park position but said gear-train is configured to allow said slider to move from said not-park position to said park position without rotation of said gear-train.

11. The shift-by-wire system of claim 10, wherein said cam rotates about an off-center pivot axis to engage said follower associated with said slider.

12. The shift-by-wire system of claim 11, wherein said cam is part of one of a plurality of reduction gears.

13. The shift-by-wire system of claim 11, wherein said cam is secured to one of said plurality of reduction gears.

14. The shift-by-wire system of claim 11, wherein said follower includes a post extending from said slider.

15. The shift-by-wire system of claim 10, wherein said gear-train includes a default position which is configured to allow said slider to move to said park position.

16. The shift-by-wire system of claim 10, wherein when said IPM is in said not-park position, said gear-train is configured to allow said slider to move to said park position and only said actuator system is retaining said slider in said not-park position.

17. The shift-by-wire system of claim 10, wherein said gear-train includes a default position which is configured to allow said slider to move to said park position.

18. The shift-by-wire system of claim 17, wherein once said actuator system retains said slider in said not-park position, said gear-train continues to rotate back to said default position and said slider remains in said not-park position.

19. The shift-by-wire system of claim 17, wherein said gear-train further includes a stay-out-of-park position corresponding to said maximum lift region.

* * * * *